United States Patent Office 3,775,413
Patented Nov. 27, 1973

---

3,775,413
DIASTEREOISOMERIC SALTS OF 3,4-(1′,3′-DI-BENZYL - 2′ - OXO-IMIDAZOLIDO)-2-OXO-5-HYDROXY-TETRAHYDROFURAN
Masataka Shibasaki, Toyonaka, Mitsuru Matsubara, Kobe, Jiro Ohnogi, Toyonaka, and Keijiro Shibata, Takatsuki, Japan, assignors to Tanabe Seiyaku Co., Ltd., Osaka, Japan
No Drawing. Filed June 13, 1972, Ser. No. 262,355
Int. Cl. C07d 43/24
U.S. Cl. 260—284                2 Claims

ABSTRACT OF THE DISCLOSURE

Diastereoisomeric salts of 3,4-(1′,3′-dibenzyl-2-oxo-imidazolido)-2-oxo-5-hydroxy-tetrahydrofuran and cinchonidine or quinine which are useful as intermediates in the synthesis of d-biotin.

---

This invention relates to new diastereoisomeric salts. More particularly, it relates to the salt of 3,4-(1′,3′-dibenzyl - 2′-oxo-imidazolido)-2-oxo-5-hydroxy-tetrahydrofuran and cinchonidine or quinine.

The diastereoisomeric salts are novel and useful as intermediates in the synthesis of d-biotin. d-Biotin, which is known as vitamin H, is an anti-dermatitis agent.

It has been known that dl-biotin can be prepared from fumaric acid through the process of ten steps (U.S. Pat. No. 2,489,232) and d-biotin can be separated by resolving the resultant dl-biotin (J.A.C.S., 67, 2100–2102 (1945)).

However, there has been known no method for the racemization of l-biotin produced as the byproduct. Therefore, the above-method has an apparent disadvantage that a half of the product, namely l-biotin is of no use, so that the cost of producing l-biotin is inevitably included in the cost of producing d-biotin.

Recently a method for preparing d-biotin was reported wherein dl - 3,4-(1′,3′-dibenzyl-2′-oxo-imidazolido)-5-hydroxy-2-oxo-tetrahydrofuran (hereinafter designated as "dl-hydroxylactone"), which corresponds to the ring closed derivative of an intermediate for the synthesis of dl-biotin described in U.S. Pat. No. 2,489,232, is converted to its pseudoester with menthol or boneol; the said pseudoester is resolved into d- and l-isomer; the said d-isomer is hydrolysed to give d-3,4-(1′,3′-dibenzyl-2′-oxo-imidazolido)-5-hydroxy-2-oxo-tetrahydrofuran (hereinafter designated as "d-hydroxylactone"); and the d-hydroxylactone is treated in accordance with the method as described in U.S. Pat. Nos. 2,489,234 and 2,489,232 to give d-biotin (Helvetica Chimica Acta, 53, 991–999 (1970)).

Another method was also reported wherein a half ester of dl-1,3-dibenzyl-imidazolidone-(2)-cis-4,5-dicarboxylic acid, which is derived from the corresponding acid anhydride described as an intermediate for the synthesis of dl-biotin in U.S. Pat. No. 2,489,232, is resolved (Belg. Pat. No. 759,512); and the resultant salt of d-carboxylic acid half ester is led to d-biotin (Belg. Pat. Nos. 759,512 and 759,513).

However, these methods are still unsatisfactory. For instance, the former method requires additional steps for converting dl-hydroxylactone into its pseudoester before the resolution and for recovering d-hydroxylactone from the resultant d-isomer of the pseudoester after the resolution. In addition, the resolution yield per se is not satisfactory. In the latter method, the separation of the salt of d-carboxylic acid half ester is troublesome and the resolution yield per se is not satisfactory.

The diastereoisomeric hydroxylactone salts of the present invention are more useful as intermediates in the synthesis of d-biotin than that of known methods. For example, the diastereoisomeric salts can be readily obtained and resolved into d- and l-isomers in good yield without difficulty, and the d-isomer can be converted into d-biotin without racemization.

The diastereoisomeric salts can be prepared by reacting dl-hydroxylactone with cinchonidine or quinine in a suitable solvent. The d-isomer of the resultant diastereoisomeric salts can be readily separated by fractional crystallization. The d-isomer thus obtained may be converted to d-3,4-(1′,3′-dibenzyl-2′-oxo-imidazolido)-2-oxo-thiolan by treatment described in U.S. Pat. No. 2,489,234, thereafter converted to d-biotin by treatments described in U.S. Pat. No. 2,389,232.

Since dl-hydroxylactone and dl-1,3-dibenzyl-cis-4-carboxy-5-formyl-imidazolidone-2 (hereinafter designated as "dl-formyl-carboxylic acid") can form the same equilibrium mixture in a solvent therefor, dl-formyl-carboxylic acid can be employed alternatively as the starting material instead of dl-hydroxylactone in the foregoing process.

The reaction of dl-hydroxylactone with cinchonidine or quinine may be preferably carried out in a conventional solvent, particularly in a polar solvent such as aqueous acetone or methyl ethyl ketone. Thus, the diastereoisomeric cinchonidine salt of dl-hydroxylactone or quinine salt of dl-hydroxylactone are produced. The diastereoisomeric salt is obtained as the mixture of d- and l-isomeric salts when the reaction was carried out in the presence of cinchonidine or quinine of over a half molar amount of dl-hydroxylactone.

On the other hand, when the reaction was carried out in the presence of cinchonidine or quinine of less than about a half molar amount, only the d-isomeric salt is formed while l-hydroxylactone does not form such salt and remains in the free form.

In both cases, the d-isomeric salt is less soluble than l-isomeric salt or l-hydroxylactone in a sufficient extent that the d-isomeric salt can be readily recovered in good yield from the reaction mixture.

The diastereoisomeric salt of d-hydroxylactone with cinchonidine or quinine thus recovered is useful as the starting material in the synthesis of d-biotin. For example, the d-isomeric salt can be readily converted into free d-hydroxylactone by treating the salt with an aqueous solution of mineral acid such as hydrochloric acid.

The d-hydroxylactone can be isolated from the reaction mixture by extraction, using a conventional organic solvent such as ethyl acetate.

Cinchonidine or quinine can be recovered from the reaction mixture by making the mixture alkaline and collecting the resultant crystals therefrom.

The foregoing process will be further illustrated by the following flow sheet and examples.

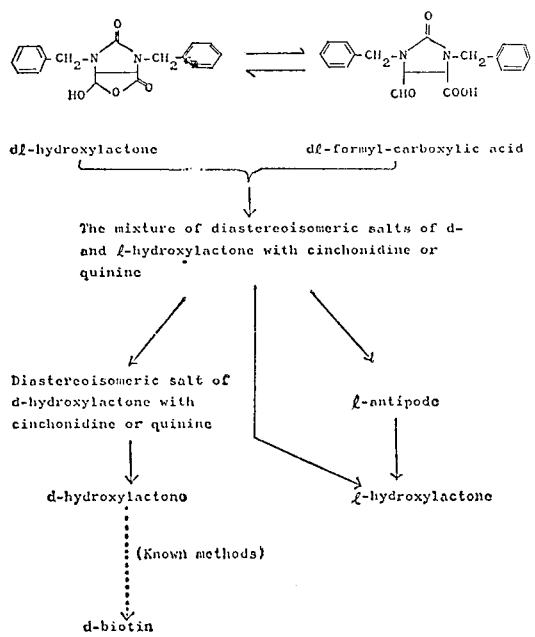

EXAMPLE 1

436 g. of di-3,4-(1',3'-dibenzyl-2'-oxo-imidazolido)-2-oxo-5-hydroxy-tetrahydrofuran are dissolved in 1933 ml. of acetone. 195 g. of cinchonidine and 644 ml. of water are added to the solution. The mixture is stirred at room temperature. After cooling, the crystalline precipitate is collected by filtration. 361 g. of the salt of d-3,4-(1',3'-dibenzyl-2'-oxo-imidazolido)-2-oxo-5-hydroxy-tetrahydrofuran and cinchonidine are obtained. M.P. 138–142.5° C. $[a]_D^{24} = -55.8$ (C=5, in methanol).

The product is dissolved in 800 ml. of 6.25% hydrochloric acid. The resultant solution is extracted with 900 ml. of ethyl acetate. The ethyl acetate solution is washed with water, dried and then evaporated to remove the solvent. The residue thus obtained is recrystallized from a mixture of 300 ml. of acetone, 150 ml. of ether and 350 ml. of petroleum ether. 180 g. of d-3,4-(1',3'-dibenzyl-2'-oxo-imidazolido) - 2 - oxo-5-hydroxy-tetrahydrofuran are obtained. Overall yield: 84%. M.P. 129–130° C. $[\alpha]_D^{30} = +19.9$ (C=1, in methanol).

On the other hand, the mother liquid obtained by filtration of the salt of d-3,4-(1',3'-dibenzyl-2'-oxo-imidazolido)-2-oxo-5-hydroxy-tetrahydrofuran and cinchonidine is evaporated to remove acetone. The residue thus obtained is dissolved in 250 ml. of 10% hydrochloric acid and then extracted with 1500 ml. of ethyl acetate. The ethyl acetate solution is washed with water, dried and then evaporated to remove the solvent. The residue thus obtained is treated with ether. The resultant crystals are recrystallized from a mixture of acetone, ether and petroleum ether. 80 g. of l-3,4-(1',3'-dibenzyl-2'-oxo-imidazolido)-2-oxo-5-hydroxy-tetrahydrofuran are obtained. Overall yield: 36.7%. M.P. 129–130° C. $[a]_D^{20} = -19.9$ (C=1, in methanol).

EXAMPLE 2

3.38 g. of dl-3,4-(1',3'-dibenzyl-2'-oxo-imidazolido)-2-oxo-5-hydroxy-tetrahydrofuran and 3.24 g. of quinine are dissolved in 20 ml. of methyl ethyl ketone. The solution is allowed to stand at room temperature. The crystalline precipitate is collected by filtration. 2.23 g. of the salt of d-3,4-(1',3'-dibenzyl-2'-oxo-imidazolido)-2-oxo - 5 - hydroxy-tetrahydrofuran and quinine are obtained. M.P. 94–97° C. $[a]_D^{20} = -86.4$ (C=1, in methanol).

The product is dissolved in 6 ml. of 1 N-hydrochloric acid. The resultant solution is extracted with 10 ml., 8 ml. and then 3 ml. of ethyl acetate, successively. Ethyl acetate solution is combined, washed with water, dried and then evaporated to remove the solvent. 0.88 g. of d-3,4-(1',3'-dibenzyl-2'-oxo-imidazolido)-2-oxo-5-hydroxy tetrahydrofuran are obtained. M.P. 129–130° C. $[a]_D^{20} = +19.9$ (C=1, in methanol).

On the other hand, the mother liquid obtained by filtration of the salt of d-3,4-(1',3'-dibenzyl-2'-oxo-imidazolido)-2-oxo-5-hydroxy-tetrahydrofuran and quinine and the solution obtained by washing the resultant crystals are combined and then evaporated to remove the solvent. The residue thus obtained is dissolved in 15 ml. of 1 N-hydrochloric acid. The resultant solution is extraced with 25 ml., 20 ml. and then 10 ml. of ethyl acetate, successively. The ethyl acetate solution is combined, washed with 18 ml. of 0.3 N-hydrochloric acid and then water, dried and then evaporated to remove the solvent. 2.11 g. of l-3,4-(1',3'-dibenzyl-2'-oxo - imidazolido)-2-oxo-5-hydroxy-tetrahydrofuran are obtained as viscous oils. $[a]_D^{20} = -7.6$ (C=1, in methanol.

We claim:
1. The salt of d-3,4-(1',3'-dibenzyl-2'-oxo-imidazolido)-2-oxo-5-hydroxy-tetrahydrofuran with cinchonidine.
2. The salt of d-3,4-(1',3'-dibenzyl-2'-oxo-imidazolido)-2-oxo-5-hydroxy-tetrahydrofuran with quinine.

References Cited
UNITED STATES PATENTS

| 2,319,545 | 5/1943 | Harris | 260—284 |
| 2,407,560 | 9/1946 | Kuhn | 260—284 |

DONALD G. DAUS, Primary Examiner

U.S. Cl. X.R.

260—309.7